United States Patent
Buer et al.

(10) Patent No.: US 9,351,273 B2
(45) Date of Patent: *May 24, 2016

(54) METHOD AND SYSTEM FOR CHARACTERIZING LOCATION AND/OR RANGE BASED ON TRANSMIT POWER

(71) Applicant: Broadcom Corporation, Irvine, CA (US)

(72) Inventors: Mark Buer, Gilbert, AZ (US); Charles Abraham, Los Gatos, CA (US); David Garrett, Tustin, CA (US); Jeyhan Karaoguz, Irvine, CA (US); David Lundgren, Mill Valley, CA (US); David Murray, Mission Viejo, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/589,753

(22) Filed: Jan. 5, 2015

(65) Prior Publication Data
US 2015/0126158 A1    May 7, 2015

Related U.S. Application Data

(63) Continuation of application No. 12/732,922, filed on Mar. 26, 2010, now Pat. No. 8,958,815.

(60) Provisional application No. 61/311,879, filed on Mar. 9, 2010.

(51) Int. Cl.
| | |
|---|---|
| *H04W 64/00* | (2009.01) |
| *G01S 5/12* | (2006.01) |
| *G01S 11/08* | (2006.01) |
| *H04W 12/06* | (2009.01) |
| *H04W 48/04* | (2009.01) |
| *H04W 52/28* | (2009.01) |
| *H04W 4/02* | (2009.01) |

(52) U.S. Cl.
CPC .............. *H04W 64/00* (2013.01); *G01S 5/12* (2013.01); *G01S 11/08* (2013.01); *H04W 12/06* (2013.01); *H04W 48/04* (2013.01); *H04W 52/283* (2013.01); *H04W 4/02* (2013.01)

(58) Field of Classification Search
CPC ........... H04W 4/02; H04W 4/20; H04W 4/26; H04W 64/00; G01S 11/08; G01S 5/12
USPC ........ 455/456.1–457, 522, 552.1, 561, 550.1, 455/422.1, 420; 370/338, 328, 329, 332, 370/310.2
See application file for complete search history.

(56) References Cited

U.S. PATENT DOCUMENTS

| | | |
|---|---|---|
| 7,366,492 B1 | 4/2008 | Ganesh |
| 7,865,132 B2 | 1/2011 | Mitchell |

(Continued)

*Primary Examiner* — Babar Sarwar
(74) *Attorney, Agent, or Firm* — Sterne, Kessler, Goldstein & Fox P.L.L.C.

(57) ABSTRACT

A transmitting communication device may iteratively adjust its transmit power, and may estimate, based on iterative transmit power adjustment, relative location of a receiving communication device. The transmit power may be initialized to a maximum value, and the transmit power may be iteratively reduced until connectivity with the receiving communication device is lost. The loss of connectivity may be determined based on reception of responses to ping messages transmitted by the transmitting communication device. The transmitting communication device may authenticate the receiving communication device and/or a user of the receiving communication device. The authentication may comprises utilizing transmit power adjustment and/or relative location estimation therefrom to ensure that a separation between the devices does not exceed a maximum value. The transmitting communication device may generate location info associated with the receiving communication device based on the relative location estimation, and may communicate the location info to a location server.

38 Claims, 5 Drawing Sheets

(56) References Cited

U.S. PATENT DOCUMENTS

| | | |
|---|---|---|
| 2003/0225893 A1 | 12/2003 | Roese et al. |
| 2006/0058054 A1 | 3/2006 | Hiramatsu |
| 2007/0111746 A1 | 5/2007 | Anderson |
| 2010/0113006 A1* | 5/2010 | Pajjuri ............... H04W 24/02 455/423 |
| 2011/0201305 A1 | 8/2011 | Buer et al. |
| 2011/0202416 A1 | 8/2011 | Buer et al. |
| 2011/0202460 A1 | 8/2011 | Buer et al. |
| 2011/0202461 A1 | 8/2011 | Lundgren et al. |
| 2011/0223931 A1 | 9/2011 | Buer et al. |

* cited by examiner

METHOD AND SYSTEM FOR CHARACTERIZING LOCATION AND/OR RANGE BASED ON TRANSMIT POWER

CROSS-REFERENCE TO RELATED APPLICATIONS/INCORPORATION BY REFERENCE

This patent application makes reference to, claims priority to and claims benefit from U.S. Provisional Application Ser. No. 61/311,879 filed on Mar. 9, 2010. This application also makes reference to:
U.S. Provisional Application Ser. No. 61/304,947 filed on Feb. 16, 2010;
U.S. application Ser. No. 12/732,849 filed Mar. 26, 2010, entitled "Method and System for Ensuring User and/or Device Anonymity for Location Based Services (LBS)";
U.S. Provisional Application Ser. No. 61/312,979 filed on Mar. 11, 2010;
U.S. application Ser. No. 12/748,106 filed Mar. 26, 2010, entitled "Method and System for Authorizing Transactions Based on Device Location";
U.S. Provisional Application Ser. No. 61/312,994 filed on Mar. 11, 2010;
U.S. application Ser. No. 12/748,175 filed Mar. 26, 2010, entitled "Method and System for Authorizing Network Transactions Based on Radio Frequency (RF) Characterization of a Device's Location";
U.S. Provisional Application Ser. No. 61/303,794 filed on Feb. 12, 2010; and
U.S. application Ser. No. 12/748,197 filed Mar. 26, 2010, entitled "Method and System for Authorizing Network Transactions Based on Radio Frequency (RF) Characterization of a Device's Location".

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for characterizing location and/or range based on transmit power.

BACKGROUND OF THE INVENTION

Location based services (LBS) applications are emerging as a new type of value-added service provided by mobile communication network. LBS applications are mobile services in which the user location information is used to enable and/or support various applications and/or services such as, for example, enhanced 911 (E-911), location-based 411, location-based messaging and/or location-based friend finding services. A location of a communication device may be determined in different ways such as, for example, using network-based technology, using terminal-based technology, and/or hybrid technology, which may be a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the communicative device and convert it into a meaningful X, Y coordinate for Location-Based Services provided via wireless communication systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for characterizing location and/or range based on transmit power, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for characterizing location and/or range based on transmit power. In various embodiments of the invention, a transmitting communication device may iteratively adjust transmit power for one or more signals transmitted by the transmitting communication device to a receiving communication device. The iterative adjustment of the transmit power may be utilized to estimate the location of the receiving communication device relative to the transmitting communication device. The transmitting communication device may comprise a wireless access point (AP) or a personal mobile communication device. The transmit power may be initialized to a maximum value, which may then be iteratively reduced until connectivity with the receiving communication device is lost. The transmitting communication device may dynamically determine the maximum value to which the transmit power is initialized. The transmitting communication device may transmit ping messages to the receiving communication device, and may estimate the relative location of the receiving communication device based on loss of connectivity between the transmitting communication device and the receiving communication device. The loss of connectivity may be determined, for example, based on reception of, or failure thereof, responses to the ping messages transmitted by the receiving communication device.

The transmitting communication device may also authenticate the receiving communication device and/or a user of the receiving communication device. In this regard, the authentication may comprise utilizing the adjustment of the transmit power and/or the estimation of the relative location of the receiving communication device to ensure that a separation between the devices does not exceed a certain value. The transmitting communication device and/or the receiving communication device may generate and/or update location related info corresponding to the determined relative locations of the two devices, based on the estimation of the relative location of the receiving communication device for example. The location related info may be communicated to a location server, which is operable to provide and/or support location based services (LBS). Furthermore, a location database for serviced device may be maintained by the transmitting communication device, and may be updated based on location related info generated and/or updated during servicing operations.

Figure 1:
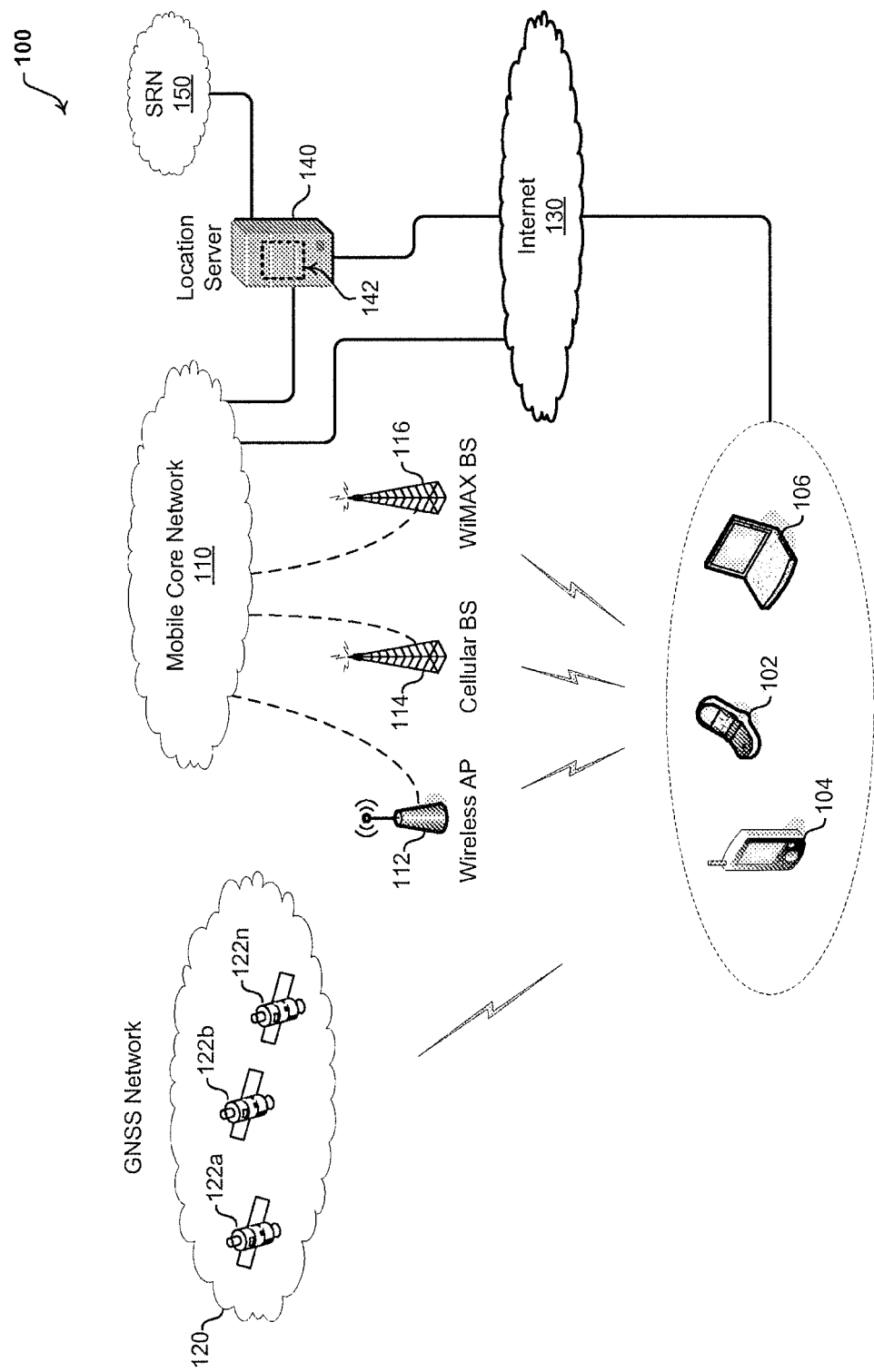
FIG. 1 is a block diagram illustrating an exemplary communication system that provides location based services to a plurality of communication devices, in accordance with an embodiment of the invention.

FIG. 1 is a block diagram illustrating an exemplary communication system that provides location based services to a plurality of communication devices, in accordance with an embodiment of the invention. Referring to FIG. 1, there is shown a communication system 100 comprising a plurality of communication device, of which the mobile communication devices 102-106 are illustrated. Exemplary communication devices may comprise the cellular device 102, the Smartphone 104, and/or the laptop 106. Also shown in the communication system 100 is a mobile core network 110, a wireless access point (AP) 112, a cellular basestation (BS) 114, a Worldwide Interoperability for Microwave Access (WiMAX) BS 116, a Global Navigation Satellite Systems (GNSS) network 120, a plurality of GNSS satellites 122a-122n, an Internet 130, a location server 140, and a satellite reference network (SRN) 150.

The GNSS network 120 may comprise suitable logic, circuitry, interfaces, and/or code that may provide navigation information to land-based devices via satellite links. The GNSS network 120 may provide positioning information via downlink satellite links transmitted to land-based devices, such as the mobile communication devices 102-106, to determine their locations. In this regard, the GNSS network 120 may comprise, for example, the plurality of GNSS satellites 122a-122n, each of which is operable to provide satellite transmissions based on a global navigation satellite system (GNSS). Exemplary GNSS systems may comprise, for example, the Global Positioning System (GPS), GLONASS and/or Galileo based satellite system. The plurality of GNSS satellites 122a-122n may directly provide positioning information and/or a land-based device may utilize satellite transmissions from different satellites to determine its location using, for example, triangulation based techniques.

The Internet 130 may comprise a system of interconnected networks and/or devices that enable exchange of information and/or data among a plurality of nodes, based on one or more networking standards, including, for example, Internet Protocols (IP). The Internet 130 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

The mobile core network 110 may comprise suitable logic, circuitry, interfaces, and/or code that are operable to provide interfacing and/or connectivity servicing among one or more access networks, which may be provide network accessibility to mobile communication devices, and external data networks such as packet data networks (PDNs) and/or the Internet 130. The mobile communication devices 102-106 may access the mobile core network 110, for example, via the wireless AP 112, the cellular BS 114, and/or the WiMAX BS 116. The mobile core network 110 may be configured to communicate various data services, which are provided by external data networks, to associated users.

The wireless AP 112 may comprise suitable logic, circuitry, interfaces, and/or code that are operable to provide data services to communication devices, such as one or more of the mobile communication devices 102-106, in adherence with one or more wireless LAN (WLAN) standards such as, for example, IEEE 802.11, 802.11a, 802.11b, 802.11d, 802.11e, 802.11n, 802.11v, and/or 802.11u. The wireless AP 112 may communicate with the mobile core network 110 and/or the Internet 130, via one or more links and/or associated devices for example. In this manner, the wireless AP 112 may provide network access to the mobile communication devices 102-106.

The cellular BS 114 may comprise suitable logic, circuitry, interfaces, and/or code that are operable to provide voice and/or data services to communication devices, such as one or more of the mobile communication devices 102-106, in adherence with one or more cellular communication standards. Exemplary cellular communication standards may comprise Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 114 may communicate with the mobile core network 110 and/or the Internet 130, via one or more backhaul links and/or associated devices for example. In this manner, the cellular BS 114 may provide network access to the mobile communication devices 102-106.

The WiMAX BS 116 may comprise suitable logic, circuitry, interfaces, and/or code that are operable to provide WiMAX based data services to communication devices, such as one or more of the mobile communication devices 102-106. The WiMAX BS 116 may communicate with the mobile core network 110 and/or the Internet 130, via one or more backhaul links and/or associated devices for example. In this manner, the WiMAX BS 116 may provide network access to the mobile communication devices 102-106.

Each of the mobile communication devices 102-106 may comprise suitable logic, circuitry, interfaces, and/or code for implementing various aspects of the invention disclosed herein. In this regard, each of the mobile communication devices 102-106 may be operable to communicate via a plurality of wired and/or wireless connections, based on wired and/or wireless protocols and/or standards. For example, each of the mobile communication devices 102-106 may be operable to transmit and/or receive signals to and/or from one or more of the wireless AP 112, the cellular BS 114, WiMAX BS 116, GNSS network 120, and/or the Internet 130. Also, each of the mobile communication devices 102-106 may be operable to communicate with, and/or receive services provided by the Internet 130 and/or the mobile core network 110. The mobile communication devices 102-106 may also be operable to utilize and/or support LBS applications.

The location server 140 may comprise suitable logic, circuitry, interfaces, and/or code that are operable to provide and/or support location based services (LBS). In this regard, the location server 140 may store and/or process location related data associated with communication devices in the system 100. The location related data may be stored in a reference database 142 in the location server 140. The location server 140 may be operable to collect and/or retrieve location related data from the communication devices. The location server 140 may also be operable to access and/or communicate with the SRN 150, for example, to collect and/or update location related data independently and/or autonomously. The SRN 150 may comprise suitable logic, circuitry, interfaces, and/or code that are operable to collect and/or distribute data from GNSS satellites, on a continuous basis. In this regard, the SRN 150 may comprise a plurality of GNSS reference tracking stations located around the world to provide A-GNSS coverage all the time in both a home network and/or any visited network. The SRN 150 may utilize satellite signal received from various GNSS constellations, such as, for example, the plurality of GNSS satellites 122a-122n of the GNSS network 120. The location server 140 may provide location related data when requested to do so.

In operation, the system 100 may provide network access to communication devices, such as the mobile communication devices 102-106, via a plurality of wireless and/or wired networks. In this regard, the mobile communication devices 102-106 may obtain network access wirelessly via the wireless AP 112, the cellular BS 114, and/or the WiMAX BS 116; and/or using wired connections, such as Ethernet based connections, to the Internet 130. The system 100 may also enable obtaining network access in a communication device via other communication devices. For example, the Smartphone 104 may utilize a wireless personal area network (WPAN) link to communicate with the laptop 106, using the network access that may be provided via the laptop 106. Exemplary WPAN protocol may comprise, for example, Bluetooth and/or ZigBee.

The system 100 may support location based services (LBS). In this regard, the location server 140 may provide location based services (LBS) in the system 100. The location server 140 may maintain, for example, the reference database 142, which may comprise profile elements corresponding to each of the mobile communication devices 102-106, and/or users thereof, for example. The location server 140 may access the SRN 150 to collect GNSS satellite data, and may utilize the collected GNSS satellite data to generate GNSS assistance data (A-GNSS data) pertaining to, and/or associated with the mobile communication devices 102-106. The location server 140 may also collect and/or retrieve location related data directly from the mobile communication devices 102-106, and/or from other entities that interact with the mobile communication devices 102-106 in the system 100, such as, for example, the wireless AP 112, the cellular BS 114, and/or the WiMAX 116. The location related data may be stored in the reference database 142. The location server 140 may communicate the stored location related data when requested to do so. In addition, the reference database 142 maintained in the location server 140 may be modified, refined, and/or updated. The adjustments may be performed, for example, based on location related data received from the SRN 150, location related data received from the mobile communication devices 102-106 and/or other communication devices in the system 100, and/or based on uses of and/or actions performed in the communication devices. The location related data maintained by the location server 140 may be utilized to augment and/or substitute for location related data received and/or generated based on communication with the GNSS network 120, for example, when communication with the GNSS network 120 is disturbed.

The location based services (LBS) applications may be utilized in the system 100 for authentication purposes. In this regard, the location related data stored and/or maintained in the location server 140 may be utilized to authenticate one or more of the mobile communication devices 102-106, users thereof, and/or locations thereof during operations performed by the mobile communication devices 102-106. For example, service providers, who may provide access servicing to the mobile communication devices 102-106, may communicate with the location server 140 to request that the location server 140 perform any such authentication procedures, and/or to obtain information necessary for performing the authentication procedures directly by the service providers. The service providers may comprise, for example, cellular, WiMAX, and/or WLAN services providers. The location server 140 may perform the necessary authentication procedures, which may be based on existing information in the reference database 142. The location server 140 may also perform authentication procedures based on current information, which may be obtained by, for example, communicating with the communication devices, to verify their present location and/or connectivity status or parameters thereof, for example. During these interactions, the location server 140 may transmit and/or receive IP packets, which may be communicated via the Internet 130, using the communication devices direct Internet connectivity; and/or indirectly via any available network access, via the wireless AP 112, the cellular 114, and/or the WiMAX AP 116, for example.

Furthermore, various security protocols and/or procedures may be used and/or implemented within the system 100 to ensure secure exchange of location related data among, for example, the location server 140, serviced entities that are to be authenticated, such as the mobile communication devices 102-106 (and/or users thereof); and/or other entities and/or devices that may seek and/or require authentication of serviced devices and/or may provide necessary information during any such operations, such as services providers for any of the mobile communication devices 102-106.

In an exemplary aspect of the invention, communication devices may adjust their transmit power, and may utilize the transmit power adjustments for and/or based on characterization of location and/or range. In this regard, a transmitting communication device, which may be utilized to provide network access to other, receiving communication devices, may adjust its transmit power, to increase or decrease its range for example, and/or to estimate a location of a receiving communication device relative to its location. The transmitting communication device may comprise a dedicated entity for providing network access, such as one or more of the wireless AP 112, the cellular BS 114, and/or the WiMAX BS 116. For example, the wireless AP 112 may be operable to adjust its transmit power, to limit and/or adjust its servicing range, and/or to estimate a location of a mobile communication device, such as the Smartphone 104, when the two devices become communicatively coupled. The transmitting communication device may also comprise a mobile communication device which may be operable to provide network access to another mobile communication device, when the two devices are communicatively coupled. For example, the laptop 106 may be utilized to provide, via a WPAN link for example, network access to the Smartphone 104. Accordingly, the laptop 106 may adjust its transmit power, to limit and/or reduce the range of the WPAN link, and/or to estimate the location of the Smartphone 104 relative to the laptop 106.

In an exemplary embodiment of the invention, the location server 140 may be operable to store and/or update absolute location information corresponding to communication devices in the system 100, such as the wireless AP 112, the Smartphone 104, and/or the laptop 106 for example, based on relative location estimates provided by at least some of these communication devices. In this regard, the reference database 142 may be updated and/or modified, for example, to reflect relative location information in corresponding user profiles of serviced communication devices. In an exemplary embodiment of the invention, location server 140 may also communicate existing location related data to communication devices when requested, which may then be utilized in conjunction with relative location information, for device and/or user authentication.

Figure 2A:
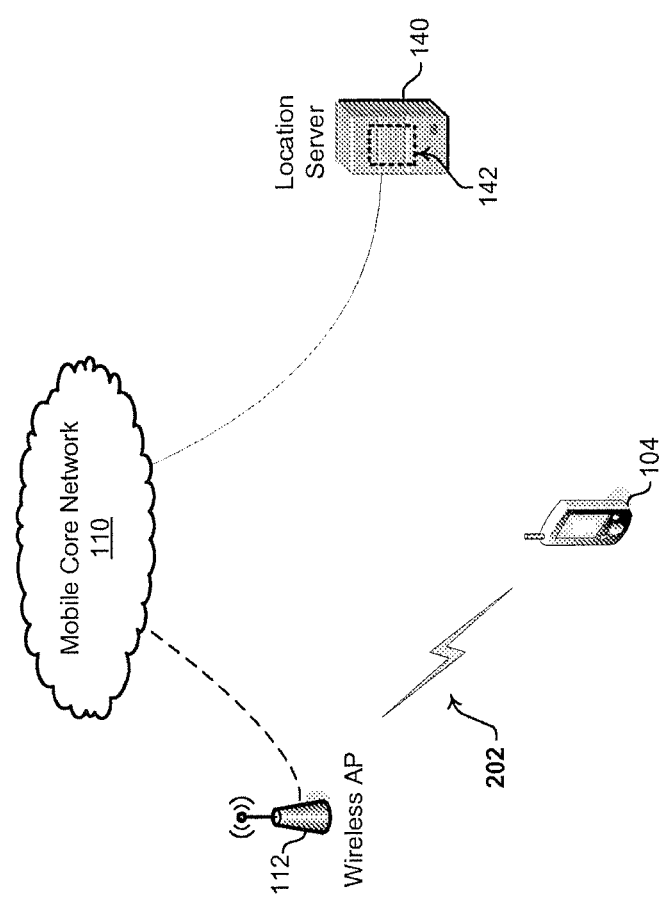
FIG. 2A is a block diagram illustrating an exemplary wireless access point is operable to characterize location and/or range based on transmit power, in accordance with an embodiment of the invention.

FIG. 2A is a block diagram illustrating an exemplary wireless access point is operable to characterize location and/or range based on transmit power, in accordance with an embodiment of the invention. Referring to FIG. 2A, there is shown the Smartphone 104, the wireless access point (AP) 112, the mobile core network 110, and the location server 140 of FIG. 1.

In operation, the wireless AP 112 may provide network access servicing to a plurality of communication device that may be located nearby, comprising, for example, the Smartphone 104. In this regard, the wireless AP 112 may provide network accessibility via a WiFi link 202, for example. In an exemplary aspect of the invention, the wireless AP 112 may adjust its transmit power during network access servicing operations. In this regard, the adjustment of transmit power may be utilized to limit and/or increase the servicing range of the wireless AP 112. For example, the wireless AP 112 may utilize WiFi beacons, via the WiFi link 202, to enable nearby communication devices searching for network access to locate the wireless AP 112. Accordingly, the transmit power used for beacon transmissions may be adjusted to increase or decrease the servicing range of the wireless AP 112. The beacon transmit power may be initialized to a predetermined and/or preconfigured value. The wireless AP 112 may also continually determined the beacon transmit power based on a plurality of criteria, comprising, for example, available resources and/or current servicing load in the wireless AP 112. In an exemplary embodiment of the invention, the wireless AP 112 may dynamically configure the transmit power based on estimation of the relative location of the serviced receiving communication device such as the Smartphone 140. In this regard, the transmit power configuration may be performed based on absolute location data corresponding to both of the wireless AP 112 and the Smartphone 104. The wireless AP 112 may retrieve, for example, the location related data from location server 140.

The wireless AP 112 may also use adjustments of transmit power to estimate a location of receiving communication devices, such as the Smartphone 104, which may be serviced by the wireless AP 112 when there is a communication line between the two communication devices. For example, after a link is established between the Smartphone 104 and the wireless AP 112, the wireless AP 112 may initiate transmission to the Smartphone 104, over the WiFi link 202, at a predetermined value, which may constitute a maximum transmit power utilized in the wireless 112, based on determination of maximum servicing range for example. The transmit power may then be reduced until contact is lost with the Smartphone 104. Decrementing transmit power to estimate relative locations of receiver devices may be performed during actual data transmissions. Alternatively, dedicated location estimation procedure may be used, wherein ping messages, for example, may be utilized in conjunction with corresponding responses from the receiving communication devices, to enable estimating relative locations. In this regard, the ping messages may be transmitted initially at a maximum transmit power value, and the transmit power may then be reduced until no ping response is received. The wireless AP 112 may then estimate the separation between it and the receiving communication devices based on the value of the transmit power at which contact was lost. In this regard, the separation may be estimated based on calculating the transmission range corresponding to the last transmit power value at which the ping responses were received. Accordingly, the smaller steps in reducing the transmit power for the ping power, the more accurate the estimation of the separation between the wireless AP 112 and the receiving communication device may be. In various embodiments of the invention, a lookup table (LUT) comprising signal strength and/or power values and corresponding distances values, may be utilized to determine the separation and/or distance between the receiving communication device and a transmitting communication device. Furthermore, various techniques may be utilized to provide additional relative location information. For example, the wireless AP 112 may utilize directional based transmission and/or reception techniques, using directional antennas for example, to estimate such direction parameters as the azimuth and elevation compared to the location of the wireless AP 112.

In an exemplary embodiment of the invention, relative location information generated by the wireless AP 112 may be communicated to the location server 140, via the mobile core network 110 for example. The location server 140 may then generate and update absolute location information corresponding to the wireless AP 112 and/or the serviced devices, such as the Smartphone 104 for example, based on relative location estimates.

Figure 2B:
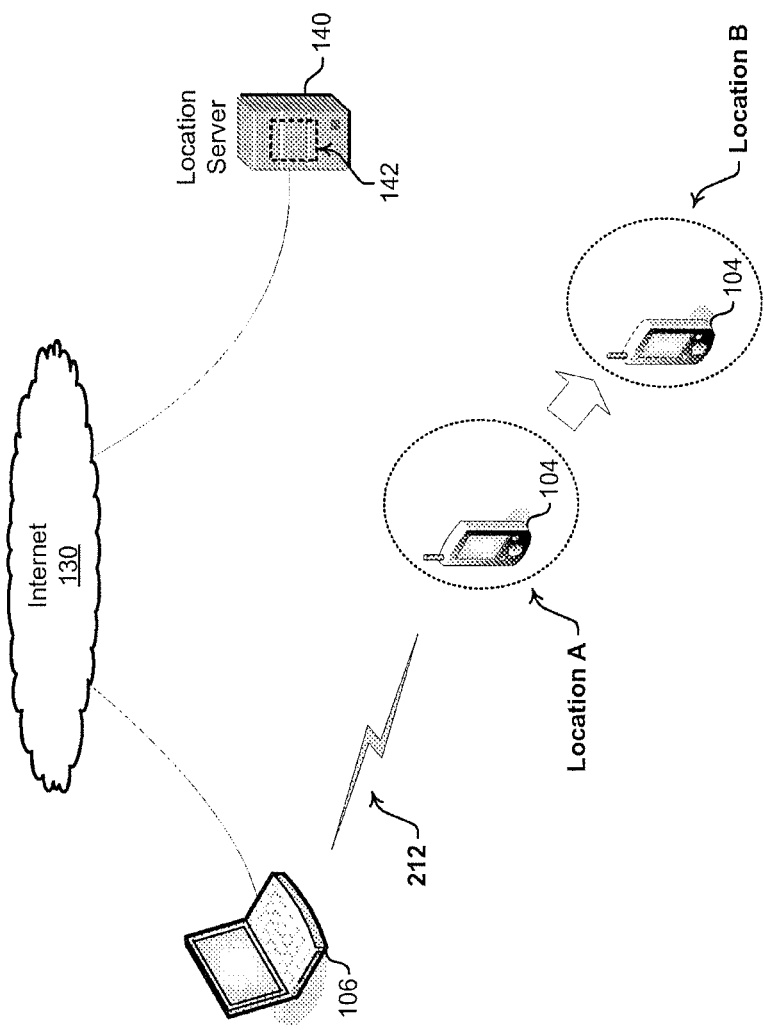
FIG. 2B is a block diagram illustrating an exemplary communication device that is operable to characterize location and/or range based on transmit power, in accordance with an embodiment of the invention.

FIG. 2B is a block diagram illustrating an exemplary communication device that is operable to characterize location and/or range based on transmit power, in accordance with an embodiment of the invention. Referring to FIG. 2B, there is shown the Smartphone 104, the laptop 106, and the location server 140 of FIG. 1.

In operation, the laptop 106 may be used to provide network access to one or more other communication device which may be located in its vicinity. For example a user of both the Smartphone 104 and the laptop 106 may obtain network access using the Internet connectivity of the laptop 106. In this regard, the Smartphone 104 may transmit and/or receive data to and/or from the laptop 106 using, for example, a WPAN link 212. In an exemplary aspect of the invention, the laptop 106 may utilize transmit power adjustment and/or configuration during network access servicing operations. In this regard, the laptop 106 may be operable to utilize transmit power adjustment beacons, substantially as described with regard to the wireless AP 112 in, for example, FIG. 2A. The laptop 106 may also similarly utilize transmit power adjustments to estimate a location of a receiving communication device, such as the Smartphone 104, relative to the laptop 106 when a link is established between the two communication devices, substantially as described with regard to the wireless AP 112 in, for example, FIG. 2A. In this regard, the laptop 106 may also utilize transmit power adjustment during actual data transmission and/or when using dedicated ping messages/responses. The laptop 106 may also communicate relative location information generated by the laptop 106, based on location estimation operations for example, to the location server 140, via the Internet 130. The location server 140 may then generate and update absolute location information corresponding to the laptop 106 and/or the serviced devices, such as the Smartphone 104 for example, based on the received relative location estimates.

In an exemplary embodiment of the invention, adjustment and/or control of transmit power may be utilized by the laptop 106 to authenticate serviced devices and/or users thereof. This may be performed during certain types of network access operations, such as transaction related network access where private and/or confidential information may be transmitted and/or received via the WPAN link 212. In this regard, the transmit power may be configured to a predetermined maximum value, for example, to ensure that the Smartphone 104 would remain within predetermined, limited distance (e.g. few meters) from the laptop 106. For example, based on the configured transmit power, the Smartphone 104 may be authorized to conduct certain confidential transaction via the WPAN link 212 using the Internet connectivity of the laptop when it is located in location A. However, when the Smartphone 104 is located, either initially or subsequent to initiation of a particular transaction, at location B, which may be further away from the laptop 106, the Smartphone 104 may not be able to utilize the WPAN link 212. This may occur because the transmit power used for transmissions by the laptop 106 over the WPAN link 212 may be inadequate to support communication at distances corresponding to the separation between the laptop 106 and location B. In some embodiments of the invention, the Smartphone 104 may also be operable to performed secure login procedures when conducting at least some of these confidential transactions. Furthermore, in instances where the Smartphone 104 moves from serviceable location, such as location A, after initiating a confidential transaction and conducting a necessary secure login procedure to an unserviceable location, such as location B, and then moves back to a serviceable location, the Smartphone 104 may be required to re-perform the secure login procedure.

Figure 3:
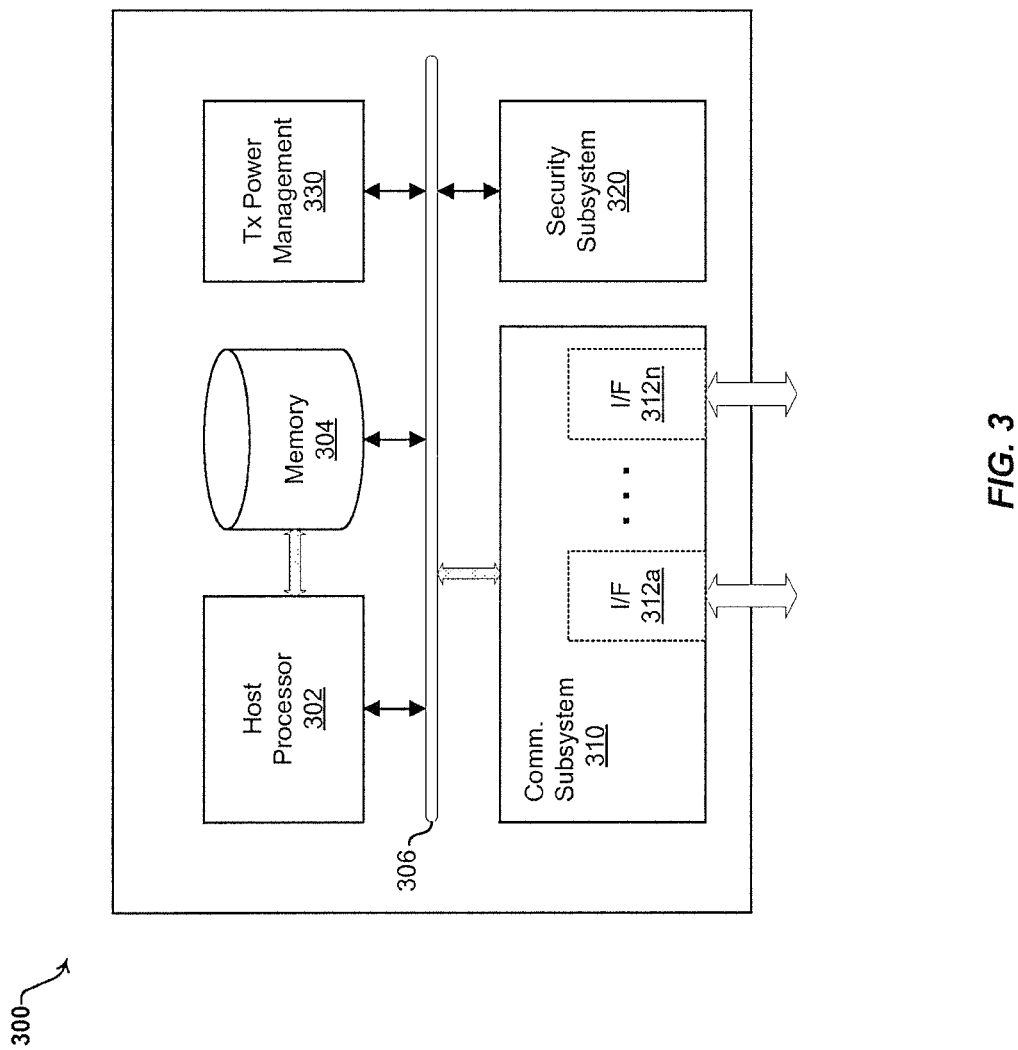
FIG. 3 is a block diagram illustrating an exemplary processing system that is operable to support characterization of location and/or range based on transmit power in a communicative device, in accordance with an embodiment of the invention.

FIG. 3 is a block diagram illustrating an exemplary processing system that is operable to support characterization of location and/or range based on transmit power in a communication device, in accordance with an embodiment of the invention. Referring to FIG. 3 there is shown a processing system 300, a host processor 302, a system memory 304, a system bus 306, a communication subsystem 310, a plurality of interface processing blocks 312a-312n, a security subsystem 320, and a transmit (Tx) power management processor 330.

The processing system 300 may comprise the host processor 302, the system memory 304, the system bus 306, the communication subsystem 310, the security subsystem 320, and the Tx power management processor 330. The processing system 300 may be integrated into a communication device, such as the wireless AP 112 and/or one or more of the mobile communication devices 102-106, to enable reception and/or transmission of signals during communication via one or more wired and/or wireless connections. The processing system 300 may also be operable to support LBS applications. In an exemplary aspect of the invention, the processing system 300 may support use of transmit power adjustment and/or configuration in instances when the communication device comprising the processing system 300 provides network access and/or services to other communication devices.

The host processor 302 may comprise suitable logic, circuitry, interfaces, and/or code that may be operable to process data and/or control operations of the processing system 300. In this regard, the host processor 302 may be operable to configure and/or control operations of various components and/or systems of the processing system 300, by providing, for example, control signals. The host processor 302 may also control data transfers within the processing system 300. The host processor 302 may enable execution of applications, programs and/or code, which may be stored in the system memory 304 for example, to enable performing various web browsing support operations.

The system memory 304 may comprise suitable logic, circuitry, interfaces, and/or code that enable permanent and/or non-permanent storage and/or fetching of data, code and/or other information used in the processing system 300. In this regard, the system memory 304 may comprise different memory technologies, including, for example, read-only memory (ROM), random access memory (RAM), and/or Flash memory. The system memory 304 may store, for example, information comprising configuration data used during LBS operations in the processing system 300. The configuration data may comprise parameters and/or code, which may comprise software and/or firmware, but the configuration data need not be limited in this regard.

The system bus 306 may comprise suitable logic, circuitry, interfaces, and/or code that may enable exchange of data and/or information between various components and/or systems in the processing system 300. In this regard, the system bus may comprise parallel or serial, and/or internal or external based bus technologies, and/or any combinations thereof. Exemplary system bus interfaces may comprise Inter-Integrated Circuit ($I^2C$), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The communication subsystem 310 may comprise suitable logic, circuitry, code, and/or interfaces that may enable communication of data, content, and/or messaging from and/or to the processing system 300, based on one or more wired and/or wireless protocols. The communication subsystem 310 may comprise, for example, the plurality of I/F processing blocks 312a-312n that may be operable to perform communication based on wired or wireless standards supported in the processing system 300. In this regard, each of the plurality of I/F processing blocks 312a-312n may comprise suitable logic, circuitry, interfaces, and/or code that are operable to detect, receive, and/or transmit signals based on specific frequency bands and/or modulation schemes. The I/F processing blocks 312a-312n may also be operable to perform necessary processing operations, which may comprise, for example, buffering, filtering, modulation/demodulation, up-conversion/down-conversion, and/or digital-to-analog/analog-to-digital conversion. The plurality of the IF processing blocks 312a-312n may be configured to support, for example, transmission and/or reception of RF signals during communication based on Ethernet, Bluetooth, WLAN, cellular, WiMAX, GNSS, FM interfaces and/or protocols.

The security subsystem 320 may comprise suitable logic, circuitry, interfaces, and/or code that may operable to perform security related operations in the processing system 300. In this regard, the security subsystem 320 may perform device and/or user authentication, certificate usage, and/or cryptographic operations in the processing system 300.

The Tx power management processor 330 may comprise suitable logic, circuitry, interfaces, and/or code that may be operable to control and/or manage transmit power adjustment and/or configuration during network access servicing via the processing system 300. While the Tx power management processor 330 is shown in FIG. 3 as a separate component within the processing system 300, the invention need not be so limited. For example, at least some of the functionality and/or operations described herein with regard to the Tx power management processor 330 may be performed by other components of the processing system 300, such as the host processor 302 for example.

In operation, the processing system 300 may be utilized to perform network access and/or communication based on one or more wired or wireless interfaces. In this regard, the processing system 300 may provide network accessibility and/or communication, via the communication subsystem 310, with the wireless AP 112, the cellular BS 114, the WiMAX BS 116, and/or the Internet 130. During operations in the processing system 300, the host processor 302 may manage and/or control operations of, for example, communication subsystem 310 and/or security subsystem 320. In an exemplary aspect of the invention, the processing system 300 may be operable to support LBS applications. In this regard, the processing system 300 may utilize the communication subsystem 310 to communicate with a location server, such as the location server 140 of FIG. 1A. For example, the processing system 300 may interact with the location server 140 via the internet 130 for example, using the I/F processing block 312a, for example, which may be configurable for LAN based Ethernet communications. During LBS related operations in the processing system 300, the security subsystem 320 may support various authentication and/or confidentiality related operations performed via the processing system 300. In this regard, the security subsystem 320 may assist and/or interact with the location server 140, for example, to enable performing communication and/or user authentication procedures.

In an exemplary aspect of the invention, the processing system 300 may be utilized to provide network access to communication devices. For example, the processing system 300 may be integrated into the wireless AP 112 and/or the laptop 106 to provide network access services to other communication devices that may be located nearby, substantially as described with regard to, for example, FIGS. 2A and 2B. For example, the I/F processing block 312a may be utilized to support the WPAN link 212 which may be utilized by the laptop 106 to service the Smartphone 104, substantially as described with regard to FIG. 2B. The I/F processing block 312n may then be utilized to support wired-based Internet connectivity, which may be utilized to provide network access to the Smartphone 104 via the processing system 300. In various embodiments of the invention, the Tx power management processor 330 may control and/or manage transmit power adjustment and/or configuration during network access servicing via the processing system 300. For example, the Tx power management processor 330 may specify and/or adjust transmit power used during transmissions to serviced communication device, to decrease and/or increase the servicing range for example.

The Tx power management processor 330 may also manage and/or control transmit power configurations for beaconing type transmissions, via the I/F processing block 312a for example, which may enable communication devices searching for network access to locate and/or connect to the processing system 300. Accordingly, the transmit power used for beacon transmissions may be adjusted to increase or decrease the servicing range of the wireless AP 112. The Tx power management processor 330 may also support relative location estimation procedures in the processing system 300, substantially as described with regard to the wireless AP 112 in, for example, FIG. 2A. In this regard, the Tx power management processor 330 may manage and/or control, for example, transmit power configuration during ping messages transmissions, which may be used in conjunction with ping responses to estimate the relative location of serviced devices. In various embodiments of the invention, a lookup table (LUT), which may comprise signal strength and/or power values for transmitted ping messages and corresponding distances values, may be utilized to determine the separation and/or distance between the transmitting and receiving communication devices. In this regard, the LUT may be stored in system memory 304 and may be accessed by the Tx power management processor 330 processor during relative location estimation procedures. The transmit power adjustment and/or configuration may be performed, via the Tx power management processor 330, using predetermined and/or preconfigured values, which may be stored in and/or retrieved from the system memory 304. Alternatively, the Tx power management processor 330 may continually and/or dynamically determine transmit power adjustment parameters and/or criteria. In this regard, the Tx power management processor 330 may determine transmit power values based on, for example, available resources and/or current servicing load in the processing system 300. The Tx power management processor 330 may also be operable to dynamically configure the transmit power based on estimation of the relative location of the serviced receiving communication device, which may be performed based on absolute location data retrieved from, for example, the location server 140.

In an exemplary embodiment of the invention, the Tx power management processor 330 may support use of transmit power adjustment and/or control to authenticate serviced communication devices and/or users thereof, substantially as described with regard to the laptop 106 in, for example, FIG. 2B. For example, the Tx power management processor 330 may manage and/or control transmit power for certain transmission to ensure that serviced devices would remain within predetermined distance from the processing system 300. In this regard, the Tx power management processor 330, may use predetermined and/or preconfigured values, which may be stored in and/or retrieved from the system memory 304. The Tx power management processor 330 may also continually and/or dynamically determine transmit power adjustment parameters and/or criteria during authentication related procedures, in conjunction with, for example, the security subsystem 320.

In an exemplary embodiment of the invention, the Tx power management processor 330 may generate and/or maintain relative location information corresponding to serviced devices, which may be stored in, for example, the system memory 304. The relative location information may also be communicated to the location server 140, via the communication subsystem 310.

Figure 4:
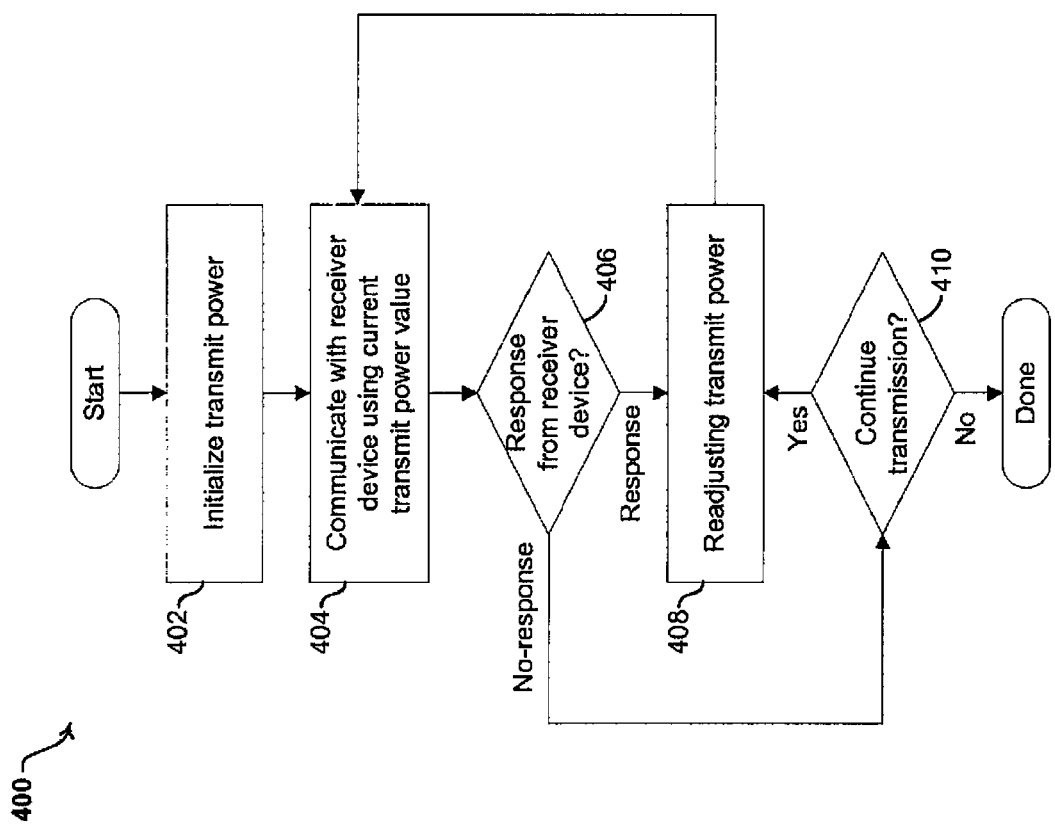
FIG. 4 is a flow chart that illustrates exemplary steps for characterizing location and/or range of a communicative device based on transmit power, in accordance with an embodiment of the invention.

FIG. 4 is a flow chart that illustrates exemplary steps for characterizing location and/or range of a communication device based on transmit power, in accordance with an embodiment of the invention. Referring to FIG. 4, there is shown a flow chart 400 comprising a plurality of exemplary steps that may be performed to characterize location and/or range of a communication device based on transmit power.

In step 402, transmit power utilized by a transmitting communication device during communications with a receiving communication device may be initialized. For example, the wireless AP 112 may set the transmit power used during transmissions to the communication device 104 via the link 202 to an initial value. Similarly, the transmit power used during transmissions by the laptop 106 to the device 104 via the link 212 may be initialized. The values utilized to initialize the transmit power may be predetermined and/or preconfigured. Alternatively, the transmitting communication devices, such as the wireless AP 112 and/or the laptop 106, may determine the initial value dynamically, based on, for example, operation and/or security criteria. In this regard, the wireless AP 112 and/or the laptop 106 may determine the initial value of transmit power based on maximum servicing range, for example. The laptop 106 may also configure the transmit power based maximum separation that may be permitted during secure login that may be performed via the Smartphone 104, substantially as described with regard to, for example, FIG. 2B.

In step 404, communication with the receiving communication device using current transmit power value may be performed. For example, the laptop 106 and/or the wireless AP 112 may transmit to the mobile device 104 using the current of transmit power value. In step 406, a determination of whether responses from the receiving communication device are received may be performed. For example, the wireless AP 112 and/or the laptop 106 may receiving one or more messages and/or signals from the mobile device 104. In this regard, the wireless AP 112 and/or the laptop 106 may utilize responses to ping messaging transmitted by these devices to estimate relative location of the receiving device, for example, substantially as described with regard to FIGS. 2A and 2B. The ping transmission may be performed periodically and/or after changes to the transmit power. In instances when responses are received from the receiving communication device, the plurality of exemplary steps may proceed to step 408.

In step 408, the transmit power may be readjusted. In this regard, the transmitting communication device may incrementally reduce its transmit power as long as communication with the receiver device are confirmed, by receiving a response or echo of ping transmission, for example. The transmit power may also be increased in instances where connectivity with receiver device which is communicatively coupled to the transmitter device is unexpectedly lost. The plurality of exemplary steps may proceed to step 404.

Returning to step 406, in instances where responses are not received from the receiving communication device, the exemplary steps may proceed to step 410. In step 412, a determination whether to continue the communication with the receiving communication device may be performed. For example, when connectivity with the communication device 104 is lost by the wireless AP 112 and/or the laptop 106, due to reduction of transmit power for example, the wireless AP 112 and/or the laptop 106 may determine whether or not to continue communications with the mobile device 104. In instances where communication with the receiving communication device is to be continued, the plurality of exemplary steps may proceed to step 408.

Various embodiments of the invention may comprise a method and system for characterizing location and/or range based on transmit power. The wireless AP 112 and/or the laptop 106 may adjust and/or configure transmit power of signals transmitted by the wireless AP 112 and/or the laptop 106 to serviced receiving communication devices, such as the Smartphone 104 for example. The adjustment of the transmit power may be utilized to estimate the location of the Smartphone 104 relative to the wireless AP 112 and/or the laptop 106. The transmit power may be initialized, via the Tx power management processor 330 for example, to a maximum value, which may be retrieved from the system memory 304. The transmit power may then be iteratively reduced until connectivity with the Smartphone 104 is lost. The Tx power management processor 330 may dynamically determine the maximum value to which the transmit power is initialized. The wireless AP 112 and/or the laptop 106 may transmit ping messages to the Smartphone 104, and may estimate the relative location of the Smartphone 104 based on loss of connectivity between the transmitting communication device and the Smartphone 104. The loss of connectivity may be determined, for example, based on reception of, for failure thereof, responses to the ping messages transmitted by the Smartphone 104.

The wireless AP 112 and/or the laptop 106 may also authenticate, via the security subsystem 320 for example, the Smartphone 104 and/or a user of the Smartphone 104. In this regard, the authentication may comprise utilizing the adjustment of the transmit power and/or the estimation of the relative location of the Smartphone 104 to ensure that a separation between the devices does not exceed a certain value. The wireless AP 112, the laptop 106, and/or the Smartphone 104 may generate and/or update location related info corresponding to the determined relative locations of the devices, based on the estimation of the relative location of the Smartphone 104 for example. The location related info may be communicated to the location server 140, which may utilize the communicated location data to update the reference database 142. Furthermore, the wireless AP 112 and/or the laptop 106 may maintain a localized location database corresponding to serviced receiving communication devices. The database may be updated based on dynamically generated relative location related data during servicing operations.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for seamless consummation of an electronic transaction based on location related data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    initializing transmit power to a first power value for a signal transmitted by a transmitting communication device to a receiving communication device;
    iteratively reducing the transmit power until a connectivity with the receiving communication device is lost; and
    estimating a location of the receiving communication device relative to the transmitting communication device based on the iterative reduction of the transmit power.

2. The method according to claim 1, wherein the transmitting communication device comprises a wireless access point or a personal mobile communication device.

3. The method according to claim 1, further comprising: authorizing the receiving communication device to communicate when a separation between the transmitting communication device and the receiving communication device is below a separation value.

4. The method according to claim 3, further comprising: dynamically determining the separation value.

5. The method according to claim 3, further comprising: authenticating at least one of the receiving communication device or a user of the receiving communication device, wherein the authenticating comprises utilizing the estimation of the location of the receiving communication device to ensure that the separation between the transmitting communication device and the receiving communication device is below the separation value.

6. The method according to claim 5, wherein the authenticating comprises authenticating the user of the receiving communication device.

7. The method according to claim 1, further comprising: transmitting ping messages to the receiving communication device; and wherein the loss of connectivity is determined based on reception of responses to the ping messages from the receiving communication device.

8. The method according to claim 1, further comprising at least one of generating or updating location-related information corresponding to the receiving communication device based on the estimation of the location of the receiving communication device.

9. The method according to claim 8, further comprising at least one of generating or updating a location database maintained by the transmitting communication device based on the location-related information.

10. The method according to claim 8, further comprising communicating the location-related information to a location server that is configured to at least one of provide or support location-based services.

11. A system for communication, the system comprising:
    circuitry configured to:
    initialize transmit power to a first power value for a signal transmitted by a transmitting communication device to a receiving communication device;
    iteratively reduce the transmit power until a connectivity with the receiving communication device is lost; and
    estimate a location of the receiving communication device relative to the transmitting communication device based on the iterative reduction of the transmit power.

12. The system according to claim 11, wherein the transmitting communication device comprises a wireless access point or a personal mobile communicative device.

13. The system according to claim 11, wherein the circuitry is further configured to authorize the receiving communication device to communicate when a separation between the transmitting communication device and the receiving communication device is below a separation value.

14. The system according to claim 13, wherein the circuitry is further configured to dynamically determine the separation value.

15. The system according to claim 13, wherein the circuitry is further configured to:
    authenticate at least one of the receiving communication device or a user of the receiving communication device, and
    utilize the estimation of the location of the receiving communication device during the authentication to ensure that the separation between the transmitting communication device and the receiving communication device is below the separation value.

16. The system according to claim 15, wherein the circuitry is configured to authenticate the user of the receiving communication device.

17. The system according to claim 11, wherein:
    the circuitry is further configured to transmit ping messages to the receiving communication device; and
    wherein the loss of connectivity is determined based on reception of responses to the ping messages from the receiving communication device.

18. The system according to claim 11, wherein the circuitry is further configured to at least one of generate or update location-related information corresponding to the receiving communication device based on the estimation of the location of the receiving communication device.

19. The system according to claim 11, wherein the circuitry is further configured to at least one of generate or update a location database maintained by the transmitting communication device based on the location-related information.

20. The system according to claim 11, wherein the circuitry is further configured to communicate the location-related information to a location server that is configured to at least one of provide or support location based services.

21. A method for communication, the method comprising:
    initializing transmit power to a first power value for a signal transmitted by a transmitting communication device to a receiving communication device;
    iteratively reducing the transmit power until a connectivity with the receiving communication device is lost;
    estimating a location of the receiving communication device relative to the transmitting communication device based on the iterative reduction of the transmit power; and
    dynamically configuring the transmit power based on estimating the location of the receiving communication device.

22. The method according to claim 21, wherein the transmitting communication device comprises a wireless access point or a personal mobile communication device.

23. The method according to claim 21, wherein dynamically configuring the transmit power is based on absolute location data corresponding to both the transmitting communication device and the receiving communication device.

24. The method according to claim 21, further comprising: transmitting ping messages to the receiving communication device; and wherein the loss of connectivity is determined based on reception of responses to the ping messages from the receiving communication device.

25. The method according to claim 21, further comprising: authenticating at least one of the receiving communication device or a user of the receiving communication device, wherein the authenticating comprises utilizing the estimation of the location of the receiving communication device to ensure that a separation between the transmitting communication device and the receiving communication device is below a first separation value.

26. The method according to claim 25, wherein the authenticating comprises authenticating the user of the receiving communication device.

27. The method according to claim 21, further comprising at least one of generating or updating location-related information corresponding to the receiving communication device based on the estimation of the location of the receiving communication device.

28. The method according to claim 27, further comprising at least one of generating or updating a location database maintained by the transmitting communication device based on the location-related information.

29. The method according to claim 27, further comprising communicating the location-related information to a location server that is configured to at least one of provide or support location-based services.

30. A system for communication, the system comprising: circuitry configured to:
- initialize transmit power to a first power value for a signal transmitted by a transmitting communication device to a receiving communication device;
- iteratively reduce the transmit power until a connectivity with the receiving communication device is lost;
- estimate a location of the receiving communication device relative to the transmitting communication device based on the iterative reduction of the transmit power; and
- dynamically configure the transmit power based on estimating the location of the receiving communication device.

31. The system according to claim 30, wherein the transmitting communication device comprises a wireless access point or a personal mobile communicative device.

32. The system according to claim 30, wherein the circuitry is configured to dynamically configure the transmit power based on absolute location data corresponding to both the transmitting communication device and the receiving communication device.

33. The system according to claim 30, wherein:
the circuitry is further configured to transmit ping messages to the receiving communication device; and
wherein the loss of connectivity is determined based on reception of responses to the ping messages from the receiving communication device.

34. The system according to claim 30, wherein the circuitry is further configured to at least one of generate or update location-related information corresponding to the receiving communication device based on the estimation of the location of the receiving communication device.

35. The system according to claim 30, wherein the circuitry is further configured to at least one of generate or update a location database maintained by the transmitting communication device based on the location-related information.

36. The system according to claim 30, wherein the circuitry is further configured to communicate the location-related information to a location server that is configured to at least one of provide or support location-based services.

37. The system according to claim 30, wherein the circuitry is further configured to:
authenticate at least one of the receiving communication device or a user of the receiving communication device, and
utilize the estimation of the location of the receiving communication device during the authentication to ensure that a separation between the transmitting communication device and the receiving communication device is below a first separation value.

38. The system according to claim 37, wherein the circuitry is configured to authenticate the user of the receiving communication device.

* * * * *